US012713077B2

(12) United States Patent
Mayhew et al.

(10) Patent No.: US 12,713,077 B2
(45) **Date of Patent: *Aug. 18, 2026**

(54) SYSTEMS AND METHODS FOR REAL-TIME ADAPTIVE BITRATE TRANSCODING AND TRANSMISSION OF TRANSCODED MEDIA

(71) Applicant: Adeia Guides Inc., San Jose, CA (US)

(72) Inventors: Steven Mayhew, Cupertino, CA (US); Maciej Dobrzynski, San Jose, CA (US); Jonathan Oliver, San Jose, CA (US)

(73) Assignee: Adeia Guides Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/781,082

(22) Filed: Jul. 23, 2024

(65) Prior Publication Data

US 2024/0380944 A1 Nov. 14, 2024

Related U.S. Application Data

(63) Continuation of application No. 17/972,706, filed on Oct. 25, 2022, now Pat. No. 12,075,124, which is a (Continued)

(51) Int. Cl.
*H04N 21/2343* (2011.01)
*H04N 21/2662* (2011.01)

(Continued)

(52) U.S. Cl.
CPC ... *H04N 21/234309* (2013.01); *H04N 21/433* (2013.01); *H04N 21/44004* (2013.01);

(Continued)

(58) Field of Classification Search
CPC ....... H04N 21/234309; H04N 21/2343; H04N 21/662; H04N 21/842; H04N 21/433;

(Continued)

(56) References Cited

U.S. PATENT DOCUMENTS 6,563,517 B1 5/2003 Bhagwat et al.
7,165,098 B1 1/2007 Boyer et al.

(Continued)

FOREIGN PATENT DOCUMENTS

CA 2539120 A1 3/2005
CN 102210160 A 10/2011

(Continued)

*Primary Examiner* — James R Sheleheda
(74) *Attorney, Agent, or Firm* — HG LAW LLP

(57) ABSTRACT

Methods and systems are provided for streaming a media asset with an adaptive bitrate transcoder. A server receives, from a client device, a first request for a first portion of the plurality of portions to be transcoded at a first bitrate. The server then starts to transcode the plurality of portions at the requested first bitrate to generate a plurality of corresponding transcoded portions. The server updates a header of a transcoded portion to include: 1) a transcode latency value; and 2) a count value indicating a number of available pre-transcoded portions of the media asset at the time the first request was received. The server then transmits the transcoded portion to the client. The client device then determines a second bitrate based on the transcode latency value included in the header of the transcoded portion corresponding to the first portion.

20 Claims, 7 Drawing Sheets

Related U.S. Application Data continuation of application No. 17/408,110, filed on Aug. 20, 2021, now Pat. No. 11,516,542, which is a continuation of application No. 17/253,721, filed as application No. PCT/US2018/047224 on Aug. 21, 2018, now Pat. No. 11,128,916.

(51) Int. Cl.

| | |
|---|---|
| ***H04N 21/433*** | (2011.01) |
| ***H04N 21/44*** | (2011.01) |
| ***H04N 21/4402*** | (2011.01) |
| ***H04N 21/462*** | (2011.01) |
| *H04N 21/845* | (2011.01) |

(52) U.S. Cl.

CPC . *H04N 21/440236* (2013.01); *H04N 21/4621* (2013.01); *H04N 21/2343* (2013.01); *H04N 21/2662* (2013.01); *H04N 21/845* (2013.01)

(58) Field of Classification Search

CPC ..... H04N 21/44004; H04N 21/440236; H04N 21/4621

See application file for complete search history.

(56) References Cited

U.S. PATENT DOCUMENTS

| | | | | |
|---|---|---|---|---|
| 7,656,948 | B2 | 2/2010 | Seong et al. | |
| 7,761,892 | B2 | 7/2010 | Ellis et al. | |
| 8,046,801 | B2 | 10/2011 | Ellis et al. | |
| 8,325,821 | B1 * | 12/2012 | Kizhepat | H04N 19/40 375/240.26 |
| 8,855,189 | B1 * | 10/2014 | Krause | G06F 16/738 707/636 |
| 9,077,667 | B2 | 7/2015 | Sridhar | |
| 9,166,864 | B1 | 10/2015 | Galligan et al. | |
| 9,510,028 | B2 | 11/2016 | Yang et al. | |
| 10,785,511 | B1 | 9/2020 | Lopez Hernandez et al. | |
| 11,128,916 | B2 * | 9/2021 | Mayhew | H04N 21/4621 |
| 11,509,946 | B1 | 11/2022 | Liu et al. | |
| 11,516,542 | B2 * | 11/2022 | Mayhew | H04N 21/234309 |
| 12,075,124 | B2 * | 8/2024 | Mayhew | H04N 21/234309 |
| 2002/0174430 | A1 | 11/2002 | Ellis et al. | |
| 2005/0190872 | A1 * | 9/2005 | Seong | H04N 21/2343 375/E7.199 |
| 2005/0251827 | A1 | 11/2005 | Ellis et al. | |
| 2009/0083279 | A1 | 3/2009 | Hasek | |
| 2010/0070608 | A1 | 3/2010 | Hosur | |
| 2013/0003864 | A1 | 1/2013 | Sullivan | |
| 2014/0025835 | A1 * | 1/2014 | Gahm | H04N 21/2401 709/231 |
| 2014/0025837 | A1 * | 1/2014 | Swenson | H04N 21/23439 709/231 |
| 2014/0165120 | A1 | 6/2014 | Losev et al. | |
| 2014/0369344 | A1 | 12/2014 | Sridhar | |
| 2016/0134673 | A1 | 5/2016 | Macinnis | |
| 2016/0191592 | A1 | 6/2016 | Asveren | |
| 2016/0219286 | A1 * | 7/2016 | Gadepalli | H04N 19/184 |
| 2017/0041201 | A1 | 2/2017 | Ilyadis et al. | |
| 2017/0078376 | A1 * | 3/2017 | Coward | H04N 19/395 |
| 2018/0167305 | A1 | 6/2018 | Syed et al. | |
| 2020/0177660 | A1 | 6/2020 | Connor et al. | |
| 2020/0344282 | A1 | 10/2020 | Macinnis | |
| 2020/0374602 | A1 | 11/2020 | Riedel et al. | |
| 2021/0195290 | A1 | 6/2021 | Mayhew et al. | |
| 2021/0385540 | A1 | 12/2021 | Mayhew et al. | |
| 2023/0188790 | A1 | 6/2023 | Mayhew et al. | |
| 2024/0380944 | A1 * | 11/2024 | Mayhew | H04N 21/234309 |

FOREIGN PATENT DOCUMENTS

| | | | |
|---|---|---|---|
| JP | 2007506305 | A | 3/2007 |
| JP | 2017069849 | A | 4/2017 |
| KR | 20090125156 | A | 12/2009 |
| KR | 20150046655 | A | 4/2015 |
| KR | 20170103869 | A | 9/2017 |
| WO | 2020040741 | A1 | 2/2020 |

* cited by examiner

SYSTEMS AND METHODS FOR REAL-TIME ADAPTIVE BITRATE TRANSCODING AND TRANSMISSION OF TRANSCODED MEDIA

CROSS REFERENCE TO RELATED APPLICATIONS

This application is a continuation of U.S. patent application Ser. No. 17/972,706, filed Oct. 25, 2022, which is a continuation of U.S. patent application Ser. No. 17/408,110, filed Aug. 20, 2021, now U.S. Pat. No. 11,516,542, which is a continuation of U.S. patent application Ser. No. 17/253,721, filed Dec. 18, 2020, now U.S. Pat. No. 11,128,916, which is a national stage application under 35 U.S.C. § 371 of International Application PCT/US2018/047224, filed Aug. 21, 2018, each of which is hereby incorporated by reference herein in its entirety.

BACKGROUND

Streaming media systems that deliver media over a network often use adaptive bitrate algorithms to optimize a balance between providing a user with the highest possible media quality (e.g., bitrate), minimizing playback stalling, wherein the transfer rate is too slow compared to the play speed, and maximizing stability by switching bitrates only when necessary. Most video systems select a bitrate that most closely matches an observed network bandwidth of the media transfer. However, in real-time on-the-fly transcoding of media, there is additional latency, independent of the network bandwidth, which is introduced by the transcoder when the bitrate is changed or when a user inputs a seek command. Conventional systems fail to account for this latency and often select a suboptimal bitrate, or even oscillate between two suboptimal bitrates. Additionally, conventional systems may not differentiate between a real-time encoded media asset and a pre-encoded media asset when requesting segments from the server. Thus, conventional systems may aggressively request additional segments, increasing the number of segments received at the suboptimal bitrate. Aggrievedly requesting segments that are not encoded yet may also lead to lower measured bandwidth, and prevent the system from encrypting at the highest possible bitrate.

SUMMARY

Accordingly, systems and methods are described herein for real-time adaptive bitrate transcoding of a media asset, and transmission of transcoded media to a client device for playback, which accounts for additional latency introduced by the transcoder. A server device may divide the media asset into a plurality of portions. A portion may be a "segment" of the media asset comprising a number of seconds of audio and/or video data and may be the minimum amount of data which can be played back by a client device. Alternatively, a portion may be a "chunk" of a segment, as defined above, which contains a small amount of data that, when combined with other chunks, forms a complete segment for playback. For example, the server device may divide the media asset into a plurality of segments, each representing a number of seconds of media content. The server device may further divide each segment into a plurality of chunks, each comprising a small amount of data from a given segment. The server device receives a request from a client device for portions of a video to be streamed at a first bitrate (e.g., the lowest possible bitrate). The server device begins to transcode the first portion at the lowest bitrate, in order to allow the client device to begin playback as soon as possible. There is a startup transcode latency involved in transcoding the first portion. The startup transcode latency may arise from a delay in initializing a transcoder to begin transcoding at a requested bitrate. In some implementations, it may be difficult to reduce the transcode latency in systems with limited hardware and processing capabilities, such as user equipment devices (e.g., set-top boxes), which do not have hardware upgradability or expandability. In some implementations, user equipment devices, such as set-top boxes, may perform the functions of the server device as described herein. For example, a set-top box may transcode a media asset for viewing on a smartphone. In some embodiments, the set-top box may transmit the media via a local area network on the user's premises. Thus, to allow the client device to receive portions at the maximum bitrate the network may support, observed bandwidth calculations must account for the startup latency introduced by the transcoder, both at the initial request and any time the request bitrate changes, which requires to transcoder to begin a new transcoding process at the new bitrate. In some implementations, the transcoder may also report a quantity of transcoded data available to the client device, allowing the client device to better determine when to request additional portions of the media asset.

In the present invention, a header of the transcoded first portion (e.g., a chunk) is updated to include a transcode latency value, which is used by the client device to calculate the network bandwidth of the response. Specifically, the client device may subtract the transcode latency value from the measured response time (i.e., the time period between the request for the first portion being sent and the transcoded portion corresponding to the first portion being received), and measure the network bandwidth based on the adjusted response time. The client device, in response to receiving the transcoded portion corresponding to the first portion, sends a second request for a second portion to be transcoded at a second bitrate. This reduces the amount of time required for the client device to receive portions at an optimal bitrate. Additionally, by providing the transcode latency value in the header of a chunk, the amount of time required before the client device can determine the optimal bitrate is reduced. Conventional systems interpret the transcoder latency as slow network conditions and request a next portion at a lower bitrate than could be supported by the network. The system described herein accounts for the transcoder latency and does not take it into account when calculating bandwidth of the network.

The second bitrate at which the second portion is to be transcoded may be determined more accurately by using the transcode latency value to determine the actual network bandwidth. In some embodiments, the time at which the second request for the second portion is sent may be determined based on the count value indicating a number of available pre-transcoded bytes or portions of the media asset at the time the first request for the first portion was received.

In some implementations, the header of each transcoded portion may also be updated to include a count value indicating a number of available pre-transcoded bytes or portions of the media asset at the time the request for a portion was received. When the count value is, or equates to, less than a number of bytes, or any other unit of data, in a full segment, the client device may delay the time at which it asks for the subsequent segment of the plurality of segments (e.g., the client device will request a new segment only when the currently played segment is finished playing). For example, a full segment may contain 100 bytes, and the count value may indicate that only 50 bytes are available. The client device may wait until a currently playing segment ends before requesting an additional segment. This allows the transcoder time to transcode enough bytes or chunks to comprise a full segment. The client device may require only one portion (e.g., only a single segment) in its local buffer (e.g., by setting a buffer depth threshold to one segment). When the count value is greater than a number of bytes or chunks in a portion (e.g., in a segment), the client device may increase the number of portions (e.g., segments) required in a playback buffer of the player device. For example, the client device may increase the number of portions (e.g., segments) required in the playback buffer to three portions. New portions may be requested immediately until the playback buffer is filled (e.g., when the buffer depth threshold is met). Having a variable buffer depth threshold improves playback experience by preventing the client device from aggressively requesting portions at times when the transcoder has not yet transcoded a sufficient amount of data for each requested portion, which could result in playback stall (e.g., reaching the end of a portion before a subsequent portion has been received) and associated low assessment of the network's bandwidth. By using a variable buffer depth threshold that depends on whether pre-transcoded portions are available, the system can request higher transcoding bitrates, because of a higher measured bandwidth of the network.

By accounting for the transcode latency and by varying the rate at which new portions (e.g., segments) are requested through the buffer depth threshold, the present invention reduces the likelihood of stalling the playback process. For example, if too high a bitrate is selected, if too many portions are requested, or both, the client device will not receive portions ahead of the end of playback of portions already in the playback buffer. This results in a stall scenario, in which the client device must wait for the transcoded data to become available in order to continue playback of the media asset.

In some aspects, a media guidance application may divide the media asset into a plurality of portions. For example, the media asset may be received as a raw media stream. The media guidance application may divide the media asset at boundary points, which may be based on frame type (e.g., I-frames), or playback duration (e.g., data comprising five seconds of media playback time). Alternatively, the media asset may be received in a segmented format, such as MPEG-2 or MPEG-4. The media guidance application may combine or further divide such segments to generate portions of a particular size (i.e., "chunks") or duration (i.e., "segments"). In an exemplary embodiment, these actions are performed by the media guidance application on a server device. However, it is contemplated that the media guidance application may perform these actions on either a server device or a client device.

The media guidance application may receive, from the client device, a first request for a first portion of the plurality of portions (e.g., a segment) to be transcoded at a first bitrate. For example, the client device may transmit to the server device a request for the first portion of the media asset transcoded at a bitrate of 400 kbps. In response to receiving the first request, the media guidance application may start to transcode the plurality of portions at the requested first bitrate to generate a plurality of corresponding transcoded portions. While described as being performed on a server device, it is contemplated that these actions may be performed on a client device.

The media guidance application may update a header of a transcoded portion of the plurality of transcoded portions corresponding to the first portion to comprise a transcode latency value, and a count value indicating a number of available pre-transcoded portions of the media asset at the time the first request was received. For example, if the media guidance application measured a time from receipt of the first request to start of the transcoder to be 100 milliseconds, the transcode latency value field of the header of the transcoded portion may be set to 100. Additionally, if 1024 bytes of media data have been transcoded at the requested bitrate, excluding the bytes comprising the first portion, the count value field of the header of the transcoded portion may be set to a value of 1024 if the media guidance application is configured to measure portion size in bytes, or may be set to 1 if the media guidance application is configured to measure portion size in kilobytes. Alternatively, the count value may indicate the number of complete segments that have been transcoded at the requested bitrate. As yet another alternative, the count value may simply be a flag indicating whether an amount of data comprising a complete segment is available. The media guidance application may then transmit the transcoded segment to the client device. In some embodiments, the transcoded segments may be transmitted as a series of chunks using HTTP chunked transfer encoding. It is contemplated that the above actions may be performed by the media guidance application on either a server device or a client device.

The media guidance application may receive, from the client device, a second request for a second portion of the plurality of portions (e.g., a second segment) to be transcoded at a second bitrate. The media guidance application may determine the second bitrate based on the transcode latency value indicated in the header of the transcoded portion corresponding to the first segment. For example, the media guidance application may account for the transcode latency when calculating a maximum bitrate that can be supported by the connection between the client device and the server device. While described as being performed on a server device, it is contemplated that the above actions may also be performed by the media guidance application on a client device.

The media guidance application may determine a time for transmission of the second request by the client device to the server device based on the count value included in the header of the transcoded portion corresponding to the first portion. For example, the media guidance application may use the count value to determine if enough media data has been transcoded to comprise a complete segment at the requested bitrate, and may request a portion only if the count value indicates data greater than or equal to a complete segment. It is contemplated that the above actions may be performed by the media guidance application on either a server device or a client device.

In some embodiments, the media guidance application may calculate the transcode latency value by determining an amount of time between the time the first request was received by the server device and the time at which transcoding at the first bitrate was started. It is contemplated that the above action may be performed by the media guidance application on either a server device or a client device.

In some embodiments, the media guidance application may determine the second bitrate based on the transcode latency value by determining an amount of time between the time the first request was transmitted by the client device and the time at which the transcoded portion corresponding to the first portion was received by the client device to arrive at a preliminary latency value. The media guidance application may subtract the transcode latency value from the preliminary latency value to arrive at a final latency value. The media guidance application may determine an observed bandwidth by dividing an amount of data contained in the transcoded portion corresponding to the first portion by the final latency value. The media guidance application may select the second bitrate based on the observed bandwidth. For example, the transcoder module of the media guidance application may have several preset output bitrate levels. The media guidance application may select the closest bitrate level that is lower than the observed bandwidth. It is contemplated that the above actions may be performed by the media guidance application on either a server device or a client device.

In some embodiments, the media guidance application may store transcoded portions in a chunk buffer at the server device prior to transmitting the transcoded portion to the client device. For example, the media guidance application may store bytes of transcoded data in the chunk buffer as a segment of the media asset is transcoded. The count value may indicate a number of transcoded portions (e.g., bytes, or other units of data) of the media asset stored in the chunk buffer. It is contemplated that the above actions may be performed by the media guidance application on either a server device or a client device.

In some embodiments, a subset of the plurality of portions (e.g., chunks) of the media asset comprise a complete segment of the media asset. The media guidance application may determine the time for transmission of the second request based on the count value by determining an amount of data represented by the count value, and determining whether the amount of data represented by the count value is greater than an amount of data comprising a complete transcoded segment at the first bitrate. For example, a complete transcoded segment may be 400 kilobytes. If the count value indicates 500 kilobytes of data are stored in the chunk buffer, the media guidance application may transmit the second request immediately. If the count value indicates 300 kilobytes of data are stored in the chunk buffer, the media guidance application may wait until playback of a currently playing segment is complete before transmitting the second request. It is contemplated that the above actions may be performed by the media guidance application on either a server device or a client device.

In some embodiments, in response to determining that the amount of data represented by the count value is less than the amount of data comprising a complete transcoded segment at the first bitrate, the media guidance application may set a buffer depth threshold to a first value. For example, the media guidance application may set the buffer depth threshold to a minimum number, such as 1. In response to determining that the amount of data represented by the count value is greater than the amount of data comprising a complete transcoded segment at the first bitrate, the media guidance application may set the buffer depth threshold to a second value that is greater than the first value. For example, the media guidance application may add one to the previous buffer depth threshold. It is contemplated that the above actions may be performed by the media guidance application on either a server device or a client device.

In some embodiments, the media guidance application may compare the number of transcoded portions stored in the playback buffer to the buffer depth threshold. In response to determining that the number of transcoded portions stored in the playback buffer meets the buffer depth threshold, the media guidance application may identify a time at which playback of a currently playing portion will end, and may transmit, from the client device, a third request for a third portion at the identified time. In response to determining that the number of transcoded portions stored in the playback buffer is less than the buffer depth threshold, the media guidance application may immediately transmit the third request from the client device. It is contemplated that the above actions may be performed by the media guidance application on either a server device or a client device.

In some embodiments, the media guidance application may store received transcoded portions in the playback buffer of the client device. The media guidance application may play back a transcoded portion at the client device. After playback of the transcoded portion, the media guidance application may remove the transcoded portion from the playback buffer. For example, the media guidance application may delete the transcoded portion. The media guidance application may compare the number of transcoded portions stored in the playback buffer to the buffer depth threshold, and continue to request additional portions until the number of portions stored in the playback buffer meets the buffer depth threshold. It is contemplated that the above actions may be performed by the media guidance application on either a server device or a client device.

In some embodiments, the server device may be a user equipment device (e.g., a set-top box), and the client device may be a mobile device of the user. The media asset may be a live broadcast received by the user equipment device from a media content source, and may be received at a single bitrate. Alternatively, the media asset may be received from an over-the-top service, such as a video-on-demand service, or an Internet streaming service (e.g., Netflix®, YouTube®, Amazon®, etc.).

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
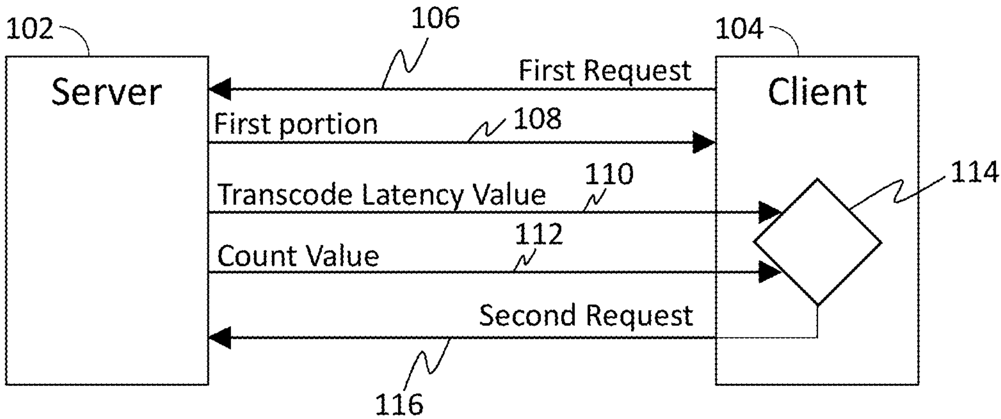
FIG. 1 is a block diagram representing transmission of data between a server device and a client device in accordance with some embodiments of the disclosure.

Systems and methods are described herein for real-time adaptive bitrate transcoding of a media asset, and transmission of transcoded media to a client device over a network for playback, which accounts for latency in the network itself, as well as any additional latency introduced by the transcoder. FIG. 1 is a block diagram representing transmission of data between a server device and a client device in accordance with some embodiments of the disclosure. Server device 102, which may be a media content source, or a user equipment device (e.g., a set-top box) may receive a media asset. Client device 104, which may be a user equipment device (e.g., a set-top box) or a mobile device of a user, may transmit a request 106 for a first portion of the media asset. Server device 102 may transmit a first portion 108 in response to the first request 106. As part of the transmission of the first portion, server device 102 may also transmit a transcode latency value 108 and a count value 110. Control circuitry 114 of the client device 104 may process the transcode latency value 110 and the count value 112 to determine a second bitrate at which to request a second portion and/or a time at which to transmit the second request. Based on the determination, client device 104 may transmit the second request 116 to the server device 102 for a second portion.

As used herein, a "portion" may be a "segment" or "chunk" of the media asset, or any other part of the media asset that represents, contains, or comprises less data than that of the media asset as a whole. A "segment" may comprise a number of seconds of media content for output on the client device, and may be the minimum unit of media which can be played back by the client device 104. For example, a segment may comprise five seconds of audio and video data representing a five-second portion of the media asset. A "chunk" may comprise a quantity of data less than that of a complete segment at a requested bitrate. A segment may be divided into a plurality of chunks for transmission using HTTP chunked transfer encoding or any other suitable streaming data transfer protocol.

The server device 102 and client device 104 may be connected via a communications network, as described below. Each of the server device 102 and client device 104 may comprise control circuitry for performing any of the steps, actions, and/or processes described herein. The server device 102 may further include transcoding circuitry, which may be part of the control circuitry, or may be a separate module. The transcoding circuitry may be implemented in hardware, firmware, or software. The client device 104 may further include a display and speaker modules for playback of transcoded media.

Figure 2:
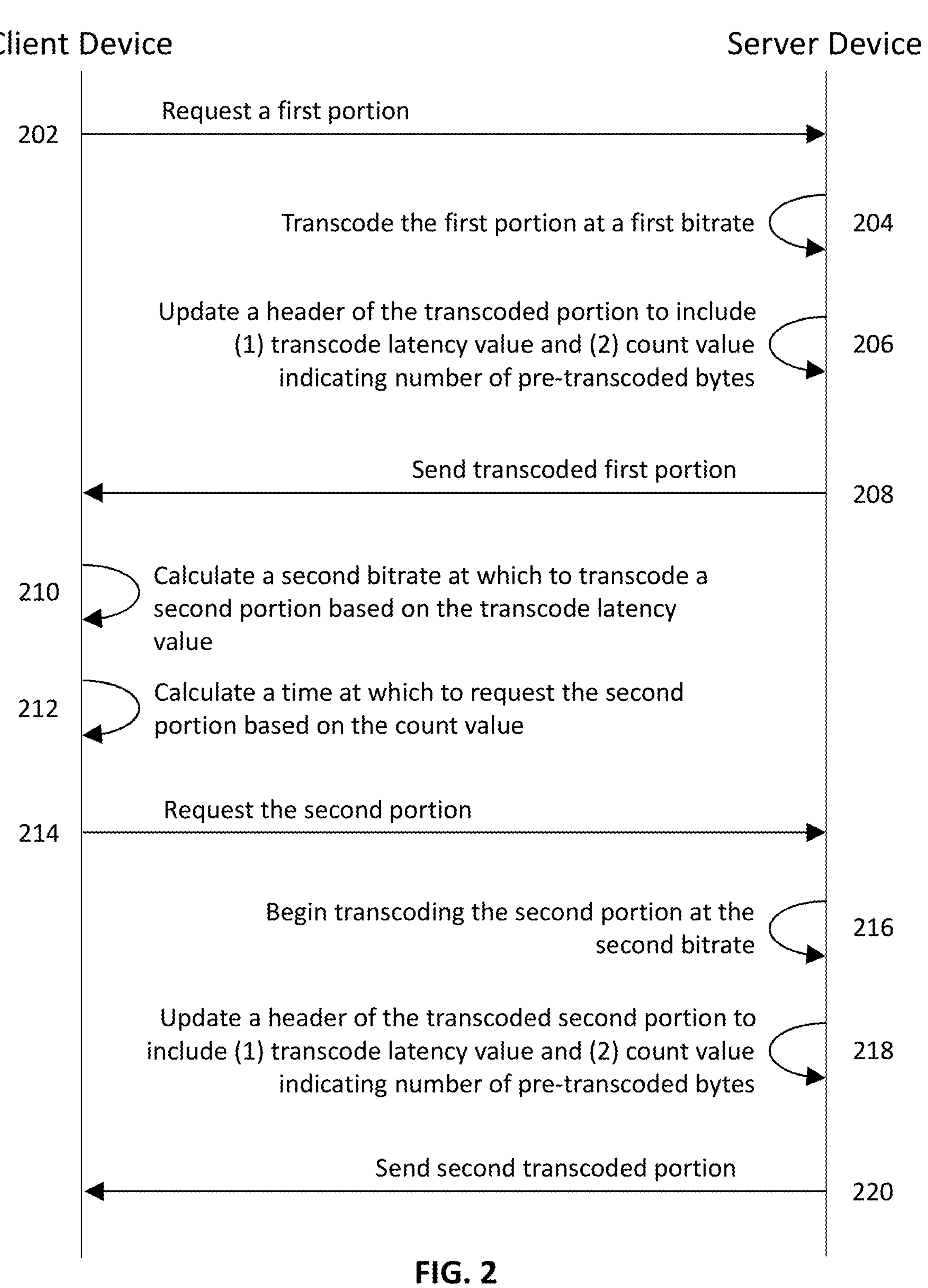
FIG. 2 is a flowchart representing a process for transcoding a media asset in accordance with some embodiments of the disclosure.

FIG. 2 is a diagram representing a process for transcoding a media asset in accordance with some embodiments of the disclosure. A media guidance application may divide the media asset into a plurality of segments. For example, the media asset may be received as a raw media stream. The media guidance application may divide the media asset at boundary points, which may be based on frame type (e.g., I-frames), or playback duration (e.g., data comprising five seconds of media playback time). Alternatively, the media asset may be received in a segmented format, such as MPEG-2 or MPEG-4. The media guidance application may combine or further divide such segments to generate segments of a particular size (i.e., "chunks") or duration (i.e., "segments").

A server device (e.g., server device 102), which may be a media content source, or a user equipment device, may receive a request 202 from a client device (e.g., client device 104) for segments of a media asset to be streamed at a first bit rate. The server device may comprise a media receiving module, a transcoding module, and a chunk buffer in which transcoded portions of the media asset are stored prior to transmission to the client device. In some embodiments, the server device may store transcoded segments in the chunk buffer prior to transmission to the client device, while in other embodiments, the server device may store chunks of transcoded data comprising transcoded segments in the chunk buffer prior to transmission to the client device. The client device may comprise a media receiving module, a player module, and playback buffer in which transcoded portions of the media asset received from the server device are stored prior to playback. In some embodiments, the client device may receive and store in the playback buffer transcoded segments of the media asset, while in other embodiments, the client device may receive and store in the playback buffer chunks of transcoded data comprising transcoded segments. An initial request may be for the lowest possible bitrate in order to allow the user to begin consuming the media asset as soon as possible. The server device may begin to transcode the first portion 204 at the lowest bitrate.

The media guidance application may update 206 a header of the transcoded first portion to include a transcode latency value, which is used to calculate the network bandwidth of the response, and a count value indicating a number of available pre-transcoded portions (e.g., bytes, or other units of data, segments, or chunks) of the media asset at the time the request for a portion 202 was received. The media guidance application may then transmit 208 the portion to the client device. The media guidance application may, at the client device, calculate 210 a second bitrate at which to transcode a second portion based on the transcode latency value by subtracting the transcode latency value from the measured response time (i.e., the time period between the request for the first portion being sent and the transcoded portion corresponding to the first portion being received), and measure the network bandwidth based on the adjusted response time. In some embodiments, the transcoded portion may be received as a single portion of the media asset, while in other embodiments, transcoded portion may be received as a plurality of chunks of transcoded media data. The transcode latency value may be included in the header of the first chunk, or may be included in the header of each chunk of the requested segment. The media guidance application may also calculate 212 a time at which the second request for the second portion is to be sent based on the count value indicating a number of available pre-transcoded bytes or portions of the media asset at the time the first request for the first portion was received. The media guidance application may transmit 214 a second request for a second portion to be transcoded at a second bitrate based on the measured network bandwidth. When the count value is less than a number of bytes or chunks in a portion, the client device delays the time at which it asks for the second portion of the plurality of portions (e.g., the client device will request a new portion only when the currently played portion is finished playing). For example, the client device may require only one portion in its local buffer. When the count value is greater than a number of bytes or chunks in a portion, the client device may increase the number of portions required in a local buffer of the player device. For example, new portions are requested immediately until the local buffer is filled. The process then repeats for the second portion, where the server device begins transcoding 216 the second portion at the second bitrate, updates 218 the header of the second portion to include the transcode latency value and the count value, and transmits 220 the second portion (or plurality of chunks comprising the second portion) to the client device.

Figure 3:
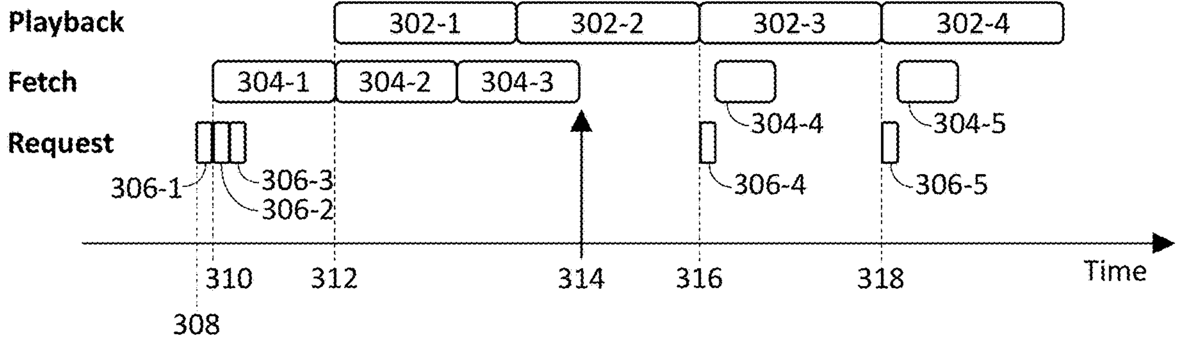
FIG. 3 is a diagram representing request, retrieval, and playback timing of a plurality of segments in accordance with some embodiments of the disclosure.

FIG. 3 is a diagram representing request, retrieval, and playback timing of a plurality of portions in accordance with some embodiments of the disclosure. As illustrated in FIG. 3, "Request" represents transmission of requests for transcoded portions from the server device. For example, request 306-1 is a request for a first transcoded portion at a first bitrate. "Fetch" represents transcoding and transmission of the requested portion to the client device. For example, 304-1 represents the time required to transcode and transmit the first portion at the first bitrate to the client device. "Playback" represents playback of portions. For example, 302-1 represents playback of the first portion.

At time 308, the media guidance application may receive, at the server device (e.g., service device 102), request 306-1 from the client device for a first portion of the plurality of portions to be transcoded at a first bitrate. For example, the client device may transmit to the server device a request for the first portion of the media asset at a bitrate of 400 kbps. The client device (e.g., client device 104) may have a playback buffer in which received portions are stored for playback. The client device may also have a buffer depth threshold, representing a maximum number of portions to be stored in the playback buffer at a given time. In the example of FIG. 3, the buffer depth threshold may be set to three portions. Thus, immediately after transmitting request 306-1 for a first portion, the client device may transmit requests 306-2 and 306-3 for additional portions at the first bitrate. These requests may be transmitted because the buffer depth threshold may be set to three portions, and the playback buffer is currently empty (or has fewer than three portions). In response to receiving the requests, at time 310, the media guidance application may, at the server device, transmit each portion to the client device (304-1, 304-2, 304-3). If the requested portions have not yet been transcoded, the media guidance application may, at the server device, transcode the data representing the requested portions.

In some embodiments, the media guidance application may update a header of a transcoded portion of the plurality of transcoded portions corresponding to the first portions to comprise a transcode latency value associated with transcoding the first portion, and a count value indicating a number of available pre-transcoded portions of the media asset at the time the first request was received. For example, if the media guidance application measured a time from receipt of the first request to the start of the transcoder to be 100 milliseconds, the transcode latency value field of the header of the transcoded portion may be set to 100. Additionally, if 1024 bytes of media data have been transcoded at the requested bitrate, excluding the bytes comprising the first portion, the count value field of the header of the transcoded portion may be set to a value of 1024 if the media guidance application is configured to measure portion size in bytes, or may be set to 1 if the media guidance application is configured to measure portion size in kilobytes. The media guidance application may then transmit the transcoded portion to the client device. The client device may, at time 312, begin playing back the portion or portions comprising the first segment as soon as they are received (302-1), and play each subsequent portion as soon as the preceding portion ends (302-2, 302-3, 302-4).

The media guidance application may receive, from the client device, a second request for a second portion of the plurality of portions to be transcoded at a second bitrate. The media guidance application, running on the client device, may determine the second bitrate based on the transcode latency value indicated in the header of at least one transcoded portion corresponding to the first portion. For example, the media guidance application may account for the transcode latency when calculating a maximum bitrate that can be supported by the connection between the client device and the server device. For example, after receiving the first three portions (304-1, 304-2, 304-3), at time 314, the media guidance application may determine that the network bandwidth may support a higher bitrate, and may subsequently request portions at a second, higher bitrate. The media guidance application may also determine that the buffer depth goal has been met. The media guidance application may then determine when a currently playing portion will end and request a new portion at that time. For example, after portion 302-2 ends, at time 316, the media guidance application may transmit a request 306-4 to the server device requesting a fourth portion.

The media guidance application may determine a time for transmission of the second request by the client device to the server device based on the count value included in the header of at least one transcoded portion corresponding to the first portion. For example, the media guidance application may use the count value to determine if enough media data has been transcoded to comprise a complete segment at the requested bitrate, and may request a portion only if the count value indicates data greater than or equal to a complete segment.

In some embodiments, the media guidance application, running on the server, may calculate the transcode latency value by determining an amount of time between the time the first request was received by the server device and the time at which the first bytes of transcoded media at the requested bitrate were produced.

In some embodiments, the media guidance application, running on the client device, may determine the second bitrate based on the transcode latency value by determining an amount of time between the time the first request was transmitted by the client device and the time at which a first transcoded portion corresponding to the first portion was received by the client device to arrive at a preliminary latency value. The media guidance application may subtract the transcode latency value from the preliminary latency value to arrive at a final latency value. The media guidance application may determine an observed bandwidth by dividing an amount of data contained in the transcoded portion corresponding to the first portion by the final latency value. The media guidance application may select the second bitrate based on the observed bandwidth. For example, the transcoder module of the media guidance application may have several preset output bitrate levels. The media guidance application may select the closest bitrate level that is lower than the observed bandwidth.

Figure 4:
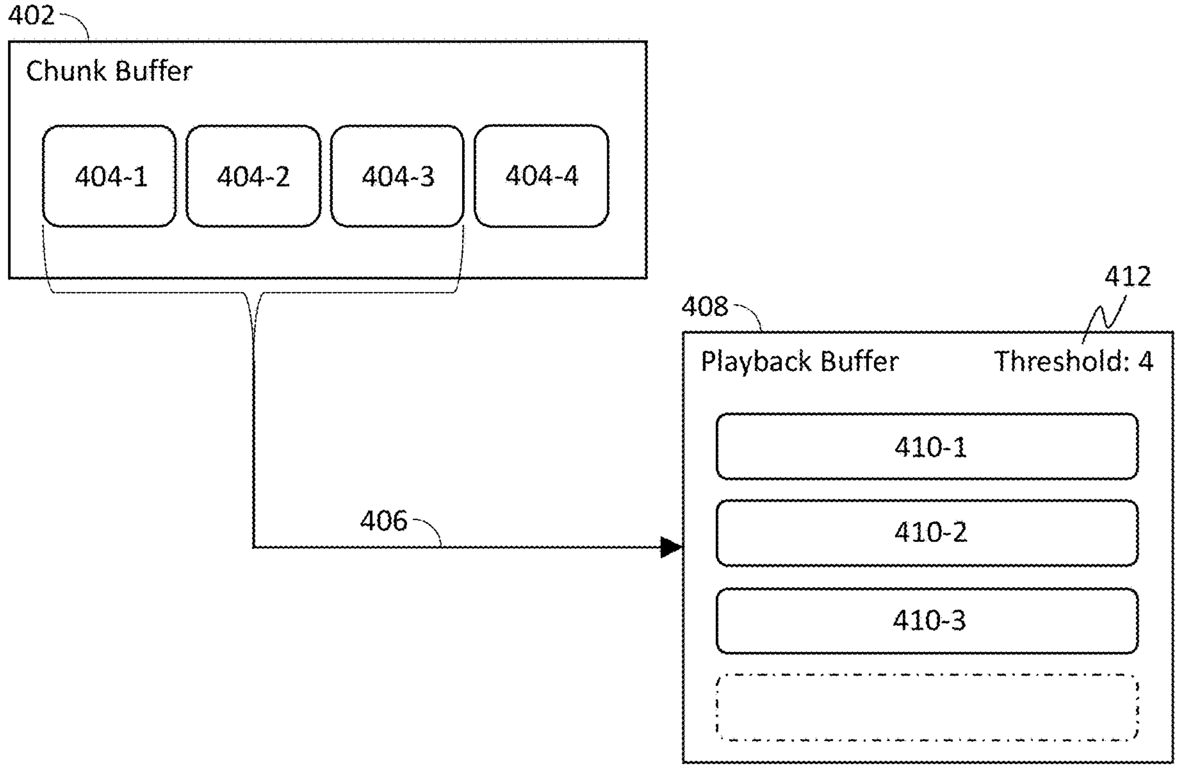
FIG. 4 is a block diagram representing storage of transcoded media data in a chunk buffer and in a playback buffer in accordance with some embodiments of the disclosure.

In some embodiments, the media guidance application may store transcoded portions in a chunk buffer at the server device (e.g., server device 102) prior to transmitting the transcoded portion to the client device (e.g., client device 104). FIG. 4 is a block diagram representing storage of transcoded media data in a chunk buffer 402 and in a playback buffer 408 in accordance with some embodiments of the disclosure. For example, the media guidance application may store portions 404-1, 404-2, 404-3, and 404-4 of transcoded data in the chunk buffer 402 as a segment of the media asset is transcoded. The count value indicates a number of transcoded portions (e.g., bytes, or other unit of data) of the media asset stored in the chunk buffer 402. In the example of FIG. 4, the count value is four. Transcoded portions comprising a complete segment may be transmitted (406) to the client device and stored in a playback buffer 408.

In some embodiments, the media guidance application may determine the time for transmission of the second request based on the count value by determining an amount of data represented by the count value, and determining whether the amount of data represented by the count value is greater than an amount of data comprising a complete transcoded segment at the first bitrate. For example, a complete transcoded segment may be 400 kilobytes. If the count value indicates 500 kilobytes of data are stored in the chunk buffer, the media guidance application may transmit the second request immediately. For example, portions 404-1, 404-2, and 404-3 may comprise a complete transcoded segment. When the client device determines that the count value indicates more data than that which comprises a complete segment, the client device may request the next segment immediately, and the server device may transmit (406) portions 404-1, 404-2, and 404-3 to the client device as a single segment. If the count value indicates 300 kilobytes of data are stored in the chunk buffer, the media guidance application may wait until playback of a currently playing segment is complete before transmitting the second request.

In some embodiments, in response to determining that the amount of data represented by the count value is less than the amount of data comprising a complete transcoded segment at the first bitrate, the media guidance application may set a buffer depth threshold 412 to a first value. For example, the media guidance application may set the buffer depth threshold to a minimum number, such as 1. In response to determining that the amount of data represented by the count value is greater than the amount of data comprising a complete transcoded segment at the first bitrate, the media guidance application may set the buffer depth threshold to a second value that is greater than the first value. For example, the media guidance application may add one to the previous buffer depth threshold. By varying the rate at which new portions are requested through the buffer depth threshold, the likelihood of stalling the playback process is reduced while increasing the likelihood that the full network bandwidth capacity will be reached. For example, if too high a bitrate is selected, if too many portions are requested, or both, the client device will not receive portions ahead of the end of playback of portions already in the playback buffer. This may result in a stall scenario, in which the client device must wait for the transcoded data to become available in order to continue playback of the media asset. Variable buffer depth helps avoid these scenarios by making sure that the client device requests a new portion only when needed for playback or when the server has a full pre-transcoded segment.

In some embodiments, the media guidance application may compare the number of transcoded portions stored in the playback buffer 408 to the buffer depth threshold 412. In the example of FIG. 4, the buffer depth threshold 412 is four, while only three portions, 410-1, 410-2, and 410-3 are stored in the playback buffer 408. In response to determining that the number of transcoded portions stored in the playback buffer meets the buffer depth threshold, the media guidance application may identify a time at which playback of a currently playing portion will end, and may transmit, from the client device, a third request for a third portion at the identified time. In response to determining that the number of transcoded portions stored in the playback buffer is less than the buffer depth threshold, as in the example of FIG. 4, the media guidance application may immediately transmit the third request from the client device.

In some embodiments, the media guidance application may store received transcoded portions in the playback buffer of the client device. The media guidance application may play back a transcoded portion at the client device. After playback of the transcoded portion, the media guidance application may remove the transcoded portion from the playback buffer. For example, the media guidance application may delete the transcoded portion. The media guidance application may compare the number of transcoded portions stored in the playback buffer to the buffer depth threshold, and continue to request additional portions until the number of portions stored in the playback buffer meets the buffer depth threshold.

In some embodiments, the server device may be a user equipment device (e.g., a set-top box), and the client device may be a mobile device of the user. For example, a user may wish to view a media asset being broadcast on a cable television channel on his or her smartphone. The media asset may be a live broadcast received by the user equipment device from a media content source, and may be received at a single bitrate. For example, the media asset may be a live sports game, such as the World Cup, and may be broadcast at a bitrate of two megabits per second. Alternatively, the media asset may be received from an over-the-top service, such as a video-on-demand service, or an Internet streaming service (e.g., Netflix®, YouTube®, Amazon®, etc.).

Users in a content delivery system desire a form of media guidance through an interface that allows users to connect to devices, efficiently navigate content selections, and give executable commands. An application that provides such guidance is referred to herein as an interactive media guidance application or, sometimes, a media guidance application or a guidance application.

Interactive media guidance applications may take various forms depending on the content for which they provide guidance. For instance, a media guidance application may run in the background of a user equipment device and monitor a user's activity. In response to receiving a user command at the user equipment device (e.g., directed towards the media guidance application and/or any alternate application), the media guidance application may execute various processes that the media guidance application is configured to implement. A media guidance application may also be stored on a remote server and may monitor several user equipment devices in real-time through the use of a wireless/wired connection. The media guidance application may execute processes at any of the respective user equipment devices depending on the user commands received at the respective user equipment devices.

Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Figure 5:
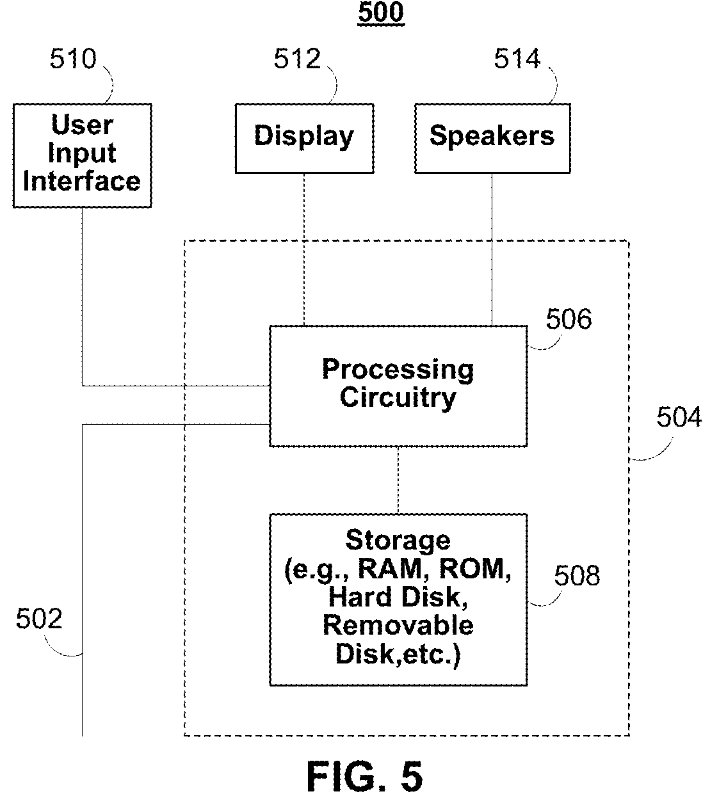
FIG. 5 shows a generalized embodiment of a stand-alone device in accordance with some embodiments of the disclosure.

Users may access content and the media guidance application (and its display screens described above and below)

from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 404 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 400. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
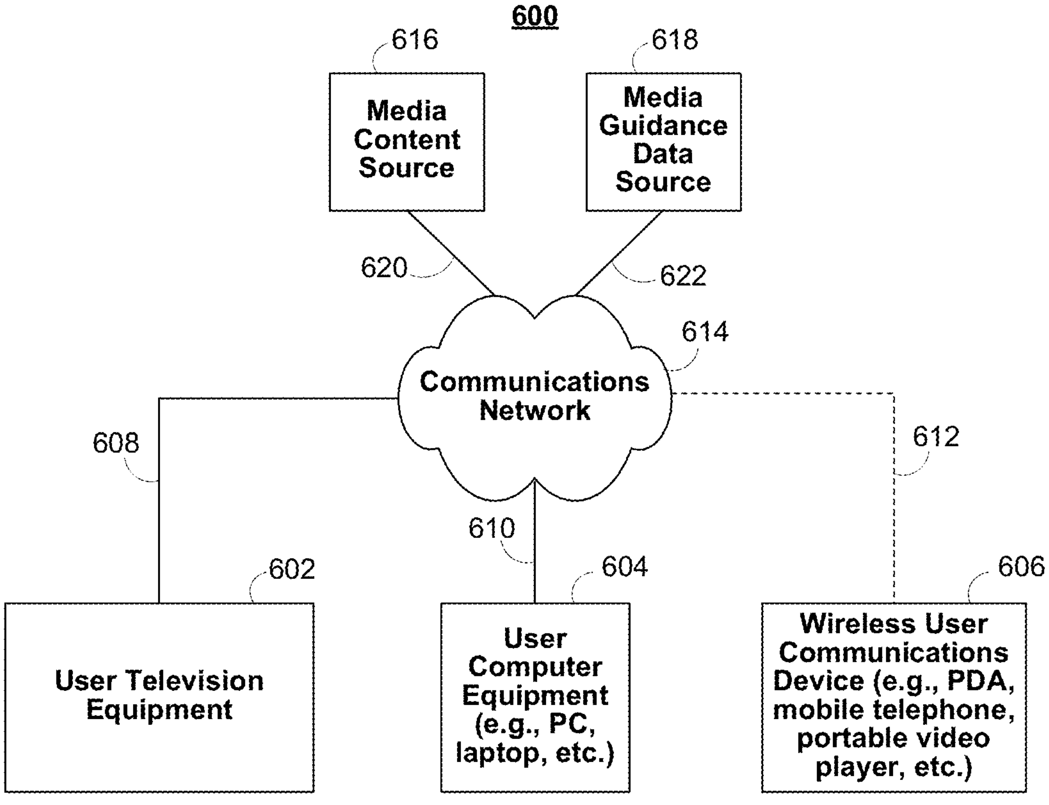
FIG. 6 shows a specific implementation of user devices in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 7:
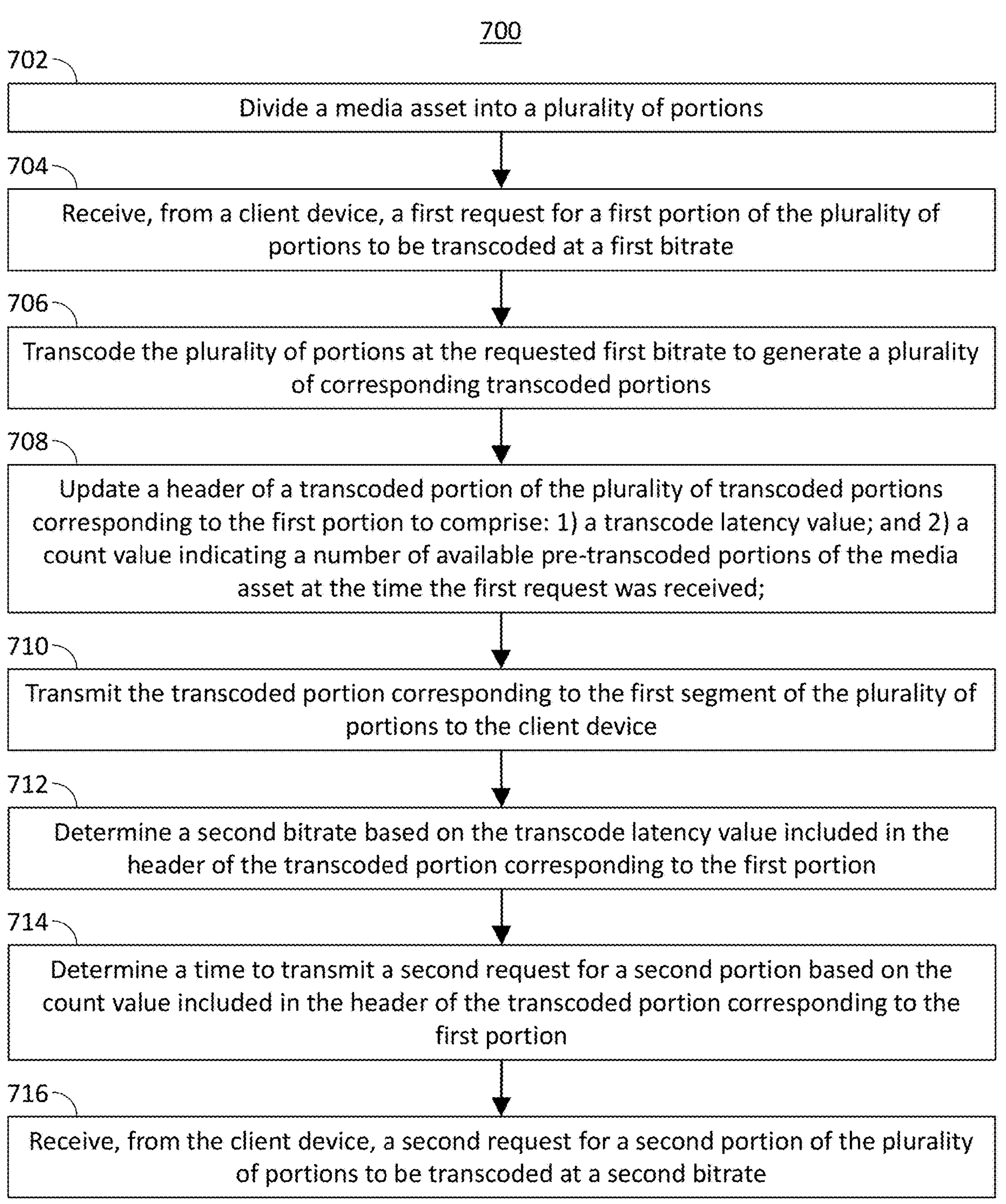
FIG. 7 is a flowchart representing a process for transcoding a media asset and transmitting transcoded media segments in accordance with some embodiments of the disclosure.

FIG. 7 is a flowchart representing an illustrative process for transcoding a media asset and transmitting transcoded media segments in accordance with some embodiments of the disclosure. The flowchart in FIG. 7 represents a process 700 implemented on control circuitry 404 for transcoding a media asset and transmitting transcoded media segments according to an embodiment of the disclosure. It should be noted that process 700 or any action thereof could be performed on, or provided by, any of the devices shown in FIGS. 5-6. For example, process 700 may be executed by control circuitry 504 (FIG. 5), which may comprise transcoding circuitry, as instructed by a media guidance application implemented on a server (e.g., server device 102, which may be media content source 616, media guidance data source 618, and/or user equipment 602, 604, 606 (FIG. 6)), or a client device (e.g., client device 104, which may be any of user equipment 602, 604, 606 (FIG. 6)) in order to transcode a media asset and transmit transcoded media segments. In addition, one or more actions of process 700 may be incorporated into or combined with one or more actions of any other process or embodiment described herein. Furthermore, process 700 may be performed exclusively on the server device 102 or be distributed between both server device 102 and client device 104.

At 702, control circuitry 504 may be configured to divide a media asset into a plurality of segments. In some embodiments, step 702 may be performed by control circuitry of server device 102. For example, the media asset may be received as a raw media stream. Control circuitry 504 may divide the media asset at boundary points, which may be based on frame type (e.g., I-frames), or playback duration (e.g., data comprising five seconds of media playback time). Alternatively, the media asset may be received in a segmented format, such as MPEG-2 or MPEG-4. Control circuitry 504 may combine or further divide such segments to generate segments of a particular size or duration. In some embodiments, each segment may be further divided into a plurality of chunks. Each chunk may comprise a small amount of data which, when combined together, comprise a complete segment.

At 704, control circuitry 504 may be configured to receive, from a client device, via communications network 614, a first request for a first segment of the plurality of segments to be transcoded at a first bitrate. In some embodiments, step 704 may be performed by control circuitry of server device 102. For example, the client device may transmit a request to the server device a request the first segment of the media asset at a bitrate of 400 kbps. The request may be transmitted via communications network 614 using HTTP, FTP, SFTP, or any other suitable data transfer protocol.

At 706, control circuitry 504 may be configured to start to transcode the plurality of segments at the requested first bitrate to generate a plurality of corresponding transcoded portions. In some embodiments, step 706 may be performed by control circuitry of server device 102. For example, a transcoding module of control circuitry 504 may access the media asset and process the media data to generate segments of media data at the requested bitrate. In some embodiments, the transcoding module of control circuitry 504 may generate a plurality of chunks for each segment being transcoded.

At 708, control circuitry 504 may be configured to update a header of a first transcoded portion corresponding to a first segment of the plurality of segments to comprise a transcode latency value, and a count value indicating a number of available pre-transcoded portions of the media asset at the time the first request was received. In some embodiments, step 708 may be performed by control circuitry of server device 102. For example, control circuitry 504 may measure a time from receipt of the first request to the start of the transcoder to be 100 milliseconds. Control circuitry 504 may then set the transcode latency value field of the header of the transcoded portion to a value of 100. Additionally, if 1024 bytes of media data have been transcoded at the requested bitrate, excluding the bytes comprising the first portion, control circuitry 504 may set the count value field of the header of the transcoded portion to a value of 1024 if control circuitry 504 is configured to measure portion size in bytes, or control circuitry 504 may set the count value field to a value of 1 if control circuitry 504 is configured to measure portion size in kilobytes.

At 710, control circuitry 504 may be configured to transmit the transcoded portion corresponding to the first portion of the plurality of portion to the client device. In some embodiments, step 710 may be performed by control circuitry of server device 102. Control circuitry 504 may transmit the transcoded portion via communications network 614 using HTTP, FTP, SFTP, RTP, RTMP, Apple HLS, MPEG-DASH, Microsoft Smooth Streaming, or any other suitable media data transfer protocol. In some embodiments, control circuitry 504 may transmit the transcoded portions using HTTP chunked transfer encoding.

At 712, control circuitry 504 may be configured to determine a second bitrate based on the transcode latency value included in the header of the transcoded portion corresponding to the first portion, at either server device 102 or client device 104. In some embodiments, step 712 may be performed by control circuitry of server 102 or by control circuitry of client 104. For example, control circuitry 504 may account for the transcode latency when calculating a maximum bitrate that can be supported by the connection between the client device and the server device, as will be described further below.

At 714, control circuitry 504 may be configured to determine a time to transmit a second request for a second portion based on the count value included in the header of the transcoded portion corresponding to the first portion. In some embodiments, step 714 may be performed by control circuitry of server 102 or by control circuitry of client 104. For example, control circuitry 404 may use the count value to determine if enough media data has been transcoded to comprise a complete segment at the requested bitrate, and may only request a portion if the count value indicates an amount of data greater than or equal to a complete segment.

At 716, control circuitry 504 may be configured to receive, from the client device, via communications network 614, a second request for a second portion of the plurality of portions to be transcoded at a second bitrate. In some embodiments, step 716 may be performed by control circuitry of server 102 or by control circuitry of client 104. This may be accomplished using methods described above in relation to the first request at 704.

It is contemplated that the actions or descriptions of FIG. 7 may be used with any other embodiment of this disclosure. In addition, the actions and descriptions described in relation to FIG. 7 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 5-6 could be used to perform one or more of the actions in FIG. 7.

Figures 8, 9:
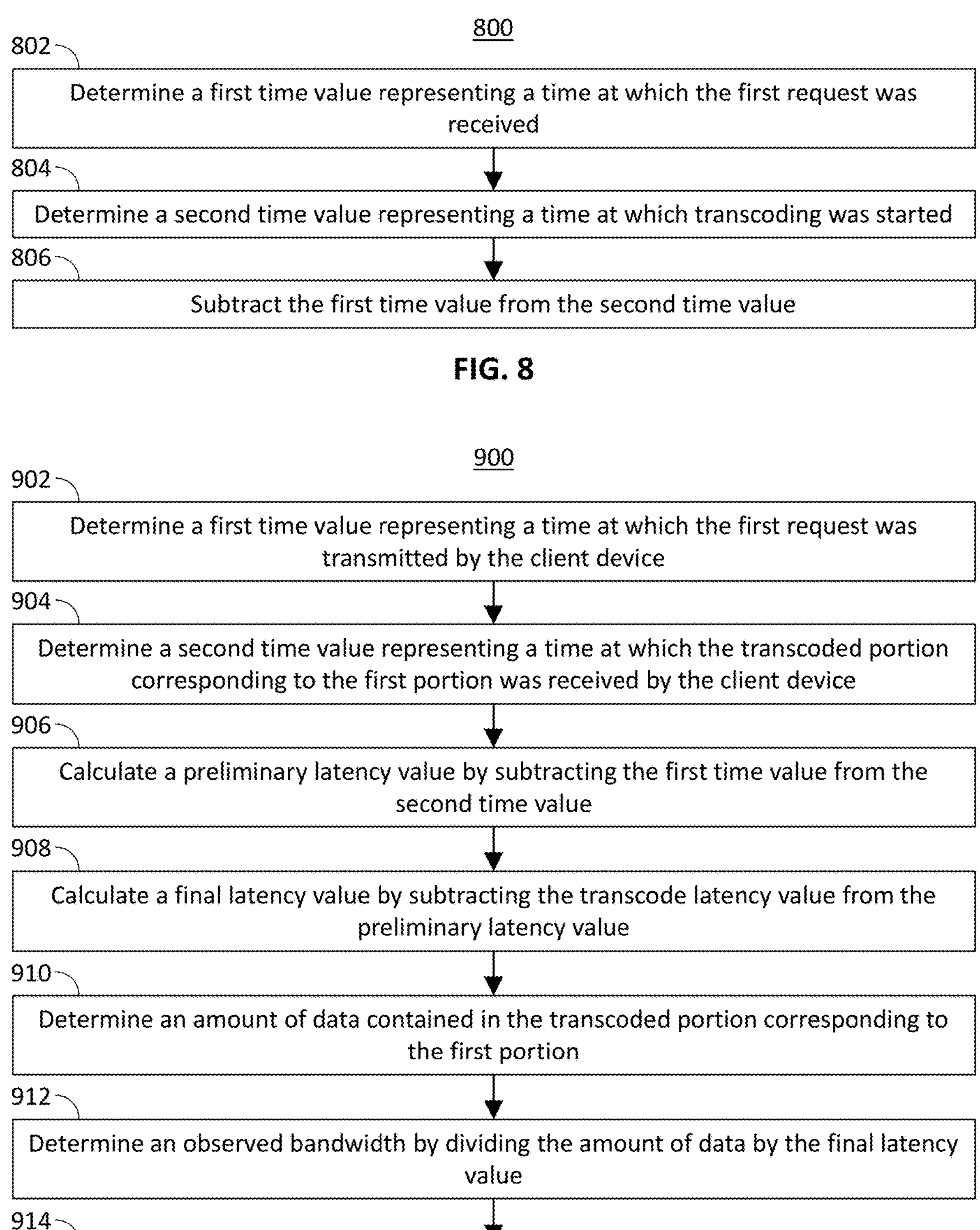
FIG. 8 is a flowchart representing a process for determining a transcode latency value in accordance with some embodiments of the disclosure.
FIG. 9 is a flowchart representing a process for selecting a second bitrate at which to transcode segments of the media asset in accordance with some embodiments of the disclosure.

FIG. 8 is a flowchart representing an illustrative process for determining a transcode latency value in accordance with some embodiments of the disclosure. The flowchart in FIG. 8 represents a process 800 implemented on control circuitry 504 for determining a transcode latency value according to an embodiment of the disclosure. It should be noted that process 800 or any action thereof could be performed on, or provided by, any of the devices shown in FIGS. 5-6. For example, process 800 may be executed by control circuitry 504 (FIG. 5), as instructed by a media guidance application implemented on a server (e.g., media content source 616, media guidance data source 618, an/or user equipment 602, 604, 606 (FIG. 6)) in order to determine a transcode latency value. In addition, one or more actions of process 700 may be incorporated into or combined with one or more actions of any other process or embodiment described herein. Furthermore, process 800 may be performed exclusively on either the server device 102 or client device 104, or may be distributed between both server device 102 and client device 104.

At 802, control circuitry 504 may be configured to determine a first time value representing a time at which the first request was received. For example, control circuitry 504 may access a timestamp recorded by the server device upon receipt of the first request. The timestamp may be stored in a log file, database or other data structure stored in, for example, storage 508.

At 804, control circuitry 504 may be configured to determine a second time value representing a time at which transcoding was started. For example, control circuitry 504 may access a timestamp recorded by the server device when the transcoder began transcoding the media asset. The timestamp may be stored in a log file, database, or other data structure stored in, for example, storage 508. Alternatively, control circuitry 504 may access a creation timestamp of the transcoded portion which may be located, for example, in the header of the transcoded portion.

At 806, control circuitry 504 may be configured to subtract the first time value from the second time value to calculate the transcode latency value.

It is contemplated that the actions or descriptions of FIG. 8 may be used with any other embodiment of this disclosure. In addition, the actions and descriptions described in relation to FIG. 8 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 5-6 could be used to perform one or more of the actions in FIG. 8.

FIG. 9 is a flowchart representing an illustrative process for selecting a second bitrate at which to transcode segments of the media asset in accordance with some embodiments of the disclosure. The flowchart in FIG. 9 represents a process 900 implemented on control circuitry 504 for selecting a second bitrate at which to transcode segments of the media asset according to an embodiment of the disclosure. It should be noted that process 900 or any action thereof could be performed on, or provided by, any of the devices shown in FIGS. 5-6. For example, process 900 may be executed by control circuitry 504 (FIG. 5) as instructed by a media guidance application implemented on a server (e.g., media content source 616, media guidance data source 618, and/or user equipment 602, 604, 606 (FIG. 6)) in order to select a second bitrate at which to transcode segments of the media asset. In addition, one or more actions of process 900 may be incorporated into or combined with one or more actions of any other process or embodiment described herein. Furthermore, process 900 may be performed exclusively on either the server device 102 or client device 104, or may be distributed between both server device 102 and client device 104.

At 902, control circuitry 504 may be configured to determine a first time value representing a time at which the first request was transmitted by the client device. For example, control circuitry 504 may access a timestamp recorded by the client device upon transmission of the first request. The timestamp may be recorded in a log file, database, or other data structure stored in, for example, storage 508. Alternatively, control circuitry 504 may access a transmission timestamp located within the request itself.

At 904, control circuitry 504 may be configured to determine a second time value representing a time at which the transcoded portion corresponding to the first portion was received by the client device. For example, control circuitry 504 may access a timestamp recorded by the client device upon receipt of the transcoded portion. The timestamp may be recorded in a log file, database, or other data structure stored in, for example, storage 508. Alternatively, control circuitry 504 may access a timestamp of an acknowledgement signal received at the server device from the client device upon receipt of the transcoded portion.

At 906, control circuitry 504 may be configured to calculate a preliminary latency value by subtracting the first time value from the second time value. At 908, control circuitry 504 may be configured to calculate a final latency value by subtracting the transcode latency value from the preliminary latency value.

At 910, control circuitry 504 may be configured to determine an amount of data contained in the transcoded portion corresponding to the first portion. For example, control circuitry 504 may access a file system or other data management system of either the client device or the server device to determine the amount of data contained in the transcoded portion. Alternatively, control circuitry 504 may access a header of the transcoded portion which may include a value indicating the amount of data contained therein. As yet another alternative, control circuitry 504 may access a log file or other data structure of either the transmission module of the server device or the receiving module of the client device to determine an amount of data transmitted or received.

At 912, control circuitry 504 may be configured to determine an observed bandwidth by dividing the amount of data by the final latency value.

At 914, control circuitry 504 may be configured to select the second bitrate based on the observed bandwidth. For example, the transcoding module of control circuitry 504 may have a set of predetermined bitrates at which it is capable of transcoding media data. Control circuitry 504 may select a bitrate from the predetermined bitrates that is closest to the observed bandwidth without exceeding the observed bandwidth. For example, the predetermined bitrate may include 200 kbps, 400 kbps, 800 kbps, 1 Mbps, and 2 Mbps. If the observed bandwidth is 950 kbps, control circuitry may select 800 kbps as the second bitrate.

It is contemplated that the actions or descriptions of FIG. 9 may be used with any other embodiment of this disclosure. In addition, the actions and descriptions described in relation to FIG. 9 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 5-6 could be used to perform one or more of the actions in FIG. 9.

Figure 10:
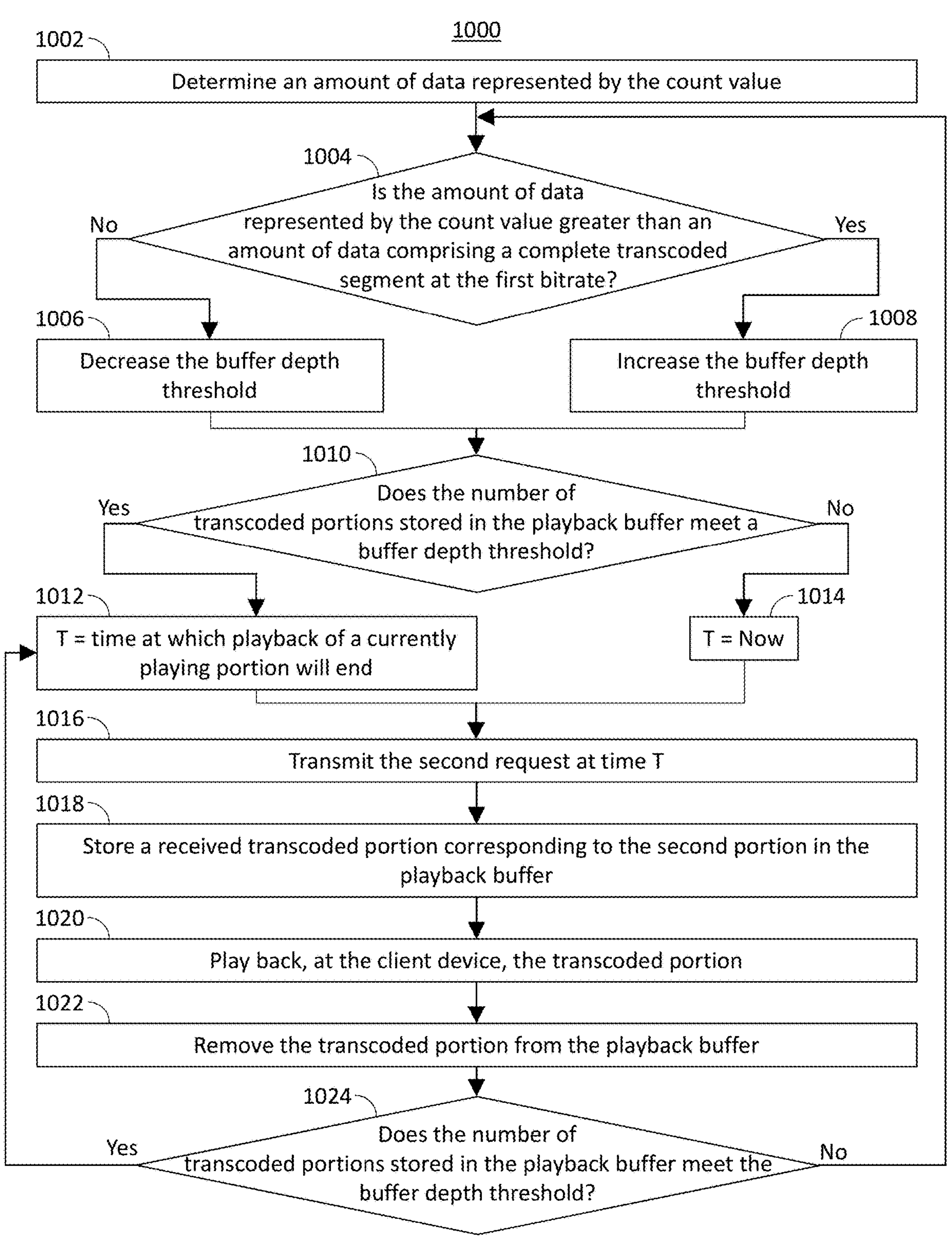
FIG. 10 is a flowchart representing a process for requesting segments from a server device in accordance with some embodiments of the disclosure.

FIG. 10 is a flowchart representing an illustrative process for requesting segments from a server device in accordance with some embodiments of the disclosure. The flowchart in FIG. 10 represents a process 1000 implemented on control circuitry 504 for requesting segments from a server device according to an embodiment of the disclosure. It should be noted that process 1000 or any action thereof could be performed on, or provided by, any of the devices shown in FIGS. 5-6. For example, process 1000 may be executed by control circuitry 504 (FIG. 5) as instructed by a media guidance application implemented on a server (e.g., media content source 616, media guidance data source 618, and/or user equipment 602, 604, 606 (FIG. 6)) in order to request segments from a server device. In addition, one or more actions of process 1000 may be incorporated into or combined with one or more actions of any other process or embodiment described herein. Furthermore, process 1000 may be performed exclusively on either the server device 102 or client device 104, or may be distributed between both server device 102 and client device 104.

At 1002, control circuitry 504 may be configured to determine an amount of data represented by the count value. For example, control circuitry 504 may determine an amount of data corresponding to a single portion of the media asset stored in the chunk buffer. Control circuitry 504 may then multiply the determined amount of data by the count value to determine the total amount of data represented by the count value. For example, the chunk buffer may store chunks containing 100 kilobits (12.5 kilobytes) of data. If the count value is five, control circuitry 504 may determine that the count value represents 500 kilobits (62.5 kilobytes) of data.

At 1004, control circuitry 504 may be configured to determine whether the amount of data represented by the count value is greater than an amount of data comprising a complete transcoded segment at the first bitrate. For example, the requested bitrate may be 400 kbps, and each segment may comprise one second of media, resulting in segments of 400 kilobits (50 kilobytes). Continuing the above example, if the count value represents 500 kilobits, control circuitry may determine that the amount of data represented by the count value is more than an amount of data comprising a complete transcoded segment at the first bitrate.

If the amount of data represented by the count value is less than an amount of data comprising a complete transcoded segment at the first bitrate, then, at 1006, control circuitry 504 may be configured to decrease the buffer depth threshold. For example, the buffer depth threshold may initially be set at three segments. If the chunk buffer is not generating data fast enough, control circuitry 504 may reduce the number of segments the client device will request to fill the playback buffer to, for example, one segment.

If the amount of data represented by the count value is greater than an amount of data comprising a complete transcoded segment at the first bitrate, then, at 1008, control circuitry 504 may be configured to increase the buffer depth threshold. For example, the buffer depth may initially be set at three segments. If the chunk buffer is receiving and/or storing complete transcoded segments fast enough, control circuitry 504 may increase the number of segments the client device will request to fill the playback buffer. For example, control circuitry 504 may increase the buffer depth threshold to maximum value, as defined by a present number, which may be stored in a variable or data structure in storage 508.

At 1010, control circuitry 504 may be configured to determine whether the number of transcoded portions stored in the playback buffer of client device 104 meet the buffer depth threshold. For example, control circuitry 504 may access the playback buffer to determine the number of portions currently stored therein, and compare the number of portions to the buffer depth threshold. In some embodiments, the buffer depth threshold may be a number of chunks comprising a given number of segment, while in other embodiments, the buffer depth threshold may be a given number of complete segments.

If the number of transcoded portions stored in the playback buffer of client device 104 meets the buffer threshold, then, at 1012, control circuitry 504 may be configured to determine to transmit the second request at a time at which a currently playing portion will end. For example, control circuitry 504 may access a playback position of the media asset on the client device and determine an amount of time remaining until the playback position reaches the end of the currently playing portion. As described below, when the currently playing portion ends, control circuitry 504 may remove the portion from the playback buffer. This results in the playback buffer having one portion less than the buffer depth threshold. Therefore, control circuitry 504 may determine the second request is to be transmitted at the time when playback of the currently playing portion ends. If the number of transcoded portions stored in the playback buffer does not meet the buffer depth threshold, then, at 1014, control circuitry 504 may be configured to determine that the second request is to be transmitted immediately.

At 1016, control circuitry 504 may be configured to transmit the second request at the determined time. The second request may be transmitted via communications network 614 using any suitable transmission protocol.

At 1018, control circuitry 504 may be configured to store the transcoded portion corresponding to the second portion received by the client device in the playback buffer. At 1020, control circuitry 504 may be configured to play back, at the client device, the transcoded portion.

At 1022, after playback of the transcoded portion is complete, control circuitry 404 may be configured to remove the transcoded portion from the playback buffer. For example, control circuitry 504 may delete the portion from the playback buffer. Alternatively, control circuitry 504 may access a memory map or memory allocation table of the playback buffer and mark the sectors, addresses, or other portions of the playback buffer as empty so that data can be written to those sectors or areas.

At 1024, control circuitry 504 may be configured to again determine whether the number of transcoded portions stored in the playback buffer meets the buffer depth threshold. If control circuitry 504 determines that the number of transcoded portions stored in the playback buffer does not meet the buffer depth threshold, processing returns to 1004. If control circuitry 504 determines that the number of transcoded portions stored in the playback buffer meets the buffer depth threshold, processing returns to 1012.

It is contemplated that the actions or descriptions of FIG. 10 may be used with any other embodiment of this disclosure. In addition, the actions and descriptions described in relation to FIG. 10 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 5-6 could be used to perform one or more of the actions in FIG. 10.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for streaming a media asset, the method comprising:

utilizing a media guidance application to divide the media asset into a plurality of portions;

receiving, from a client device, a request for a portion of the plurality of portions to be transcoded at a certain bitrate;

starting to transcode the portion at the certain bitrate to generate a transcoded portion;

updating a header of the transcoded portion to include a transcode latency value and a count value, wherein, based at least in part on the transcode latency value, the client device is caused to determine available network bandwidth, and based at least in part on the count value, variable buffer depth control is caused at the client device; and transmitting the transcoded portion to the client device.

2. The method of claim 1, comprising:

determining a variable buffer depth threshold that depends on whether pre-transcoded portions are available; and receiving, from the client device, a request for a higher transcoding bitrate based at least in part on a higher determined available network bandwidth.

3. The method of claim 1, comprising:

accounting for a startup transcode latency involved in transcoding the portion; and determining the startup transcode latency based at least in part on a time the request was received and the time at which transcoding at the certain bitrate was started.

4. The method of claim 1, further comprising:

implementing HTTP chunked transfer encoding protocol for transmitting the transcoded portion; and storing the transcoded portion in a chunk buffer prior to transmission.

5. The method of claim 1, further comprising:

causing the client device to store received transcoded portions in a playback buffer;

causing the client device to play back the transcoded portion;

causing the client device to remove the transcoded portion from the playback buffer after playback;

comparing a number of transcoded portions stored in the playback buffer to a buffer depth threshold; and continuing to receive additional requests for portions from the client device until the number of transcoded portions caused to be stored in the playback buffer meets the buffer depth threshold.

6. The method of claim 1, further comprising:

causing the client device to compare a number of transcoded portions stored in a playback buffer of the client device to a buffer depth threshold;

based at least in part on determining that the number of transcoded portions stored in the playback buffer meets the buffer depth threshold:

causing the client device to identify a time at which playback of a currently playing portion will end; and causing the client device to transmit another request for another portion at the identified time.

7. The method of claim 1, further comprising:

causing the client device to compare a number of transcoded portions stored in a playback buffer of the client device to a buffer depth threshold; and based at least in part on determining that the number of transcoded portions stored in the playback buffer is less than the buffer depth threshold:

causing the client device to immediately transmit another request.

8. The method of claim 1, wherein the count value is representative of a portion size in bytes or kilobytes.

9. The method of claim 1, wherein the count value indicates a number of segments that have been transcoded at the certain bitrate.

10. The method of claim 1, wherein the count value is a flag indicating whether an amount of data comprising a segment is available.

11. A system for streaming a media asset, the system comprising:

at least one control circuitry that:

causes utilization of a media guidance application to divide the media asset into a plurality of portions;

receives, from a client device, a request for a portion of the plurality of portions to be transcoded at a certain bitrate;

starts to transcode the portion at the certain bitrate to generate a transcoded portion;

updates a header of the transcoded portion to include a transcode latency value and a count value, wherein, based at least in part on the transcode latency value, the client device is caused to determine available network bandwidth, and based at least in part on the count value, variable buffer depth control is caused at the client device; and transmits the transcoded portion to the client device.

12. The system of claim 11, wherein the at least one control circuitry:

determines, based at least in part on the count value, a variable buffer depth threshold; and receives, from the client device, a request for a higher transcoding bitrate based at least in part on a higher determined available network bandwidth.

13. The system of claim 11, wherein the at least one control circuitry:

accounts for a startup transcode latency involved in transcoding the portion; and determines the startup transcode latency based at least in part on a time the request was received and the time at which transcoding at the certain bitrate was started.

14. The system of claim 11, wherein the at least one control circuitry:

implements HTTP chunked transfer encoding protocol for transmitting the transcoded portion; and stores the transcoded portion in a chunk buffer prior to transmission.

15. The system of claim 11, wherein the at least one control circuitry:

causes the client device to store received transcoded portions in a playback buffer;

causes the client device to play back the transcoded portion;

causes the client device to remove the transcoded portion from the playback buffer after playback;

compares a number of transcoded portions stored in the playback buffer to a buffer depth threshold; and continues to receive additional requests for portions from the client device until the number of transcoded portions caused to be stored in the playback buffer meets the buffer depth threshold.

16. The system of claim 11, wherein the at least one control circuitry:

causing the client device to compare a number of transcoded portions stored in a playback buffer of the client device to a buffer depth threshold;

based at least in part on determining that the number of transcoded portions stored in the playback buffer meets the buffer depth threshold:

causes the client device to identify a time at which playback of a currently playing portion will end; and causes the client device to transmit another request for another portion at the identified time.

17. The system of claim 11, wherein the at least one control circuitry:

causing the client device to compare a number of transcoded portions stored in a playback buffer of the client device to a buffer depth threshold; and based at least in part on determining that the number of transcoded portions stored in the playback buffer is less than the buffer depth threshold:

causes the client device to immediately transmit another request.

18. The system of claim 11, wherein the count value is representative of a portion size in bytes or kilobytes.

19. The system of claim 11, wherein the count value indicates a number of segments that have been transcoded at the certain bitrate.

20. The system of claim 11, wherein the count value is a flag indicating whether an amount of data comprising a segment is available.

* * * * *